(12) United States Patent
Reller (10) Patent No.: US 9,634,858 B2
(45) Date of Patent: Apr. 25, 2017

(54) FIELD DEVICE WITH POWER OVER ETHERNET

(75) Inventor: Troy M. Reller, Victoria, MN (US)

(73) Assignee: Rosemount Inc., Eden Prairie, MN (US)

( * ) Notice: Subject to any disclaimer, the term of this patent is extended or adjusted under 35 U.S.C. 154(b) by 632 days.

(21) Appl. No.: 11/489,931

(22) Filed: Jul. 20, 2006

(65) Prior Publication Data

US 2007/0057783 A1    Mar. 15, 2007

Related U.S. Application Data

(60) Provisional application No. 60/700,785, filed on Jul. 20, 2005.

(51) Int. Cl.
*H04L 12/28* (2006.01)
*H04L 12/40* (2006.01)
*G05B 19/042* (2006.01)

(52) U.S. Cl.
CPC ...... *H04L 12/40045* (2013.01); *G05B 19/042* (2013.01); *G05B 2219/25174* (2013.01);
(Continued)

(58) Field of Classification Search
CPC .... Y02P 90/18; Y02P 90/185; G05B 19/4185; G05B 2219/25428; G05B 2219/33192; G05B 19/0421; G05B 19/042; G05B 19/054; G05B 2219/1127; G05B 2219/25174; G05B 2219/31121; G05B 19/05; G05B 2219/25006; G05B 2219/31135

USPC ............... 370/352, 419, 425; 713/300, 310; 710/11, 305; 700/282, 1, 19; 709/250; 455/90.3; 702/183
(Continued)

(56) References Cited

U.S. PATENT DOCUMENTS 4,243,931 A    1/1981  dela Cruz ..................... 323/302
4,665,393 A    5/1987  Wilder et al. ................. 340/683
(Continued)

FOREIGN PATENT DOCUMENTS

CN         1578455        2/2005
DE     32 13 866 A1      4/1982
(Continued)

OTHER PUBLICATIONS

Communication report from European patent application 06 787 883.5, dated Feb. 11, 2009.
(Continued)

*Primary Examiner* — Derrick Ferris
*Assistant Examiner* — Lionel Preval
(74) *Attorney, Agent, or Firm* — Westman, Champlin & Koehler, P.A.

(57) ABSTRACT

A field device that communicates in accordance with Ethernet signaling is provided. The field device is powered by virtue of its Ethernet connection. The field device preferably includes a feature board that includes an Ethernet network connection and a field device connection. The feature board is configured to power the field device with power received through the Ethernet network connection. The feature board interacts with the field device using a process industry standard communication protocol. A method of operating a field device is also provided.

19 Claims, 4 Drawing Sheets

(52) U.S. Cl.
CPC .............. *G05B 2219/25428* (2013.01); *G05B 2219/31135* (2013.01); *G05B 2219/31145* (2013.01); *Y02P 90/185* (2015.11)

(58) Field of Classification Search
IPC ....................... H04L 12/40045; G05B 19/042, 2219/25174, 2219/25428, 2219/31135, 2219/31145
See application file for complete search history.

(56) References Cited

U.S. PATENT DOCUMENTS

| | | | |
|---|---|---|---|
| 4,736,367 A | 4/1988 | Wroblewski et al. | 370/449 |
| 4,939,753 A | 7/1990 | Olson | 375/107 |
| 5,307,346 A | 4/1994 | Fieldhouse | 370/254 |
| 5,333,114 A | 7/1994 | Warrior et al. | 700/67 |
| 5,442,639 A | 8/1995 | Crowder et al. | 371/20.1 |
| 5,551,053 A | 8/1996 | Nadolski et al. | 395/829 |
| 5,623,605 A | 4/1997 | Keshav et al. | 395/200.17 |
| 5,706,007 A | 1/1998 | Fragnito et al. | 341/155 |
| 5,737,543 A | 4/1998 | Gavin et al. | 710/105 |
| 5,742,845 A | 4/1998 | Wagner | 395/831 |
| 5,752,008 A | 5/1998 | Bowling | 395/500 |
| 5,761,208 A | 6/1998 | Muramatsu | 370/532 |
| 5,764,891 A | 6/1998 | Warrior | 710/72 |
| 5,805,442 A | 9/1998 | Crater et al. | 700/9 |
| 5,825,664 A | 10/1998 | Warrior et al. | 364/550 |
| 5,923,557 A | 7/1999 | Eidson | 700/129 |
| 5,936,514 A | 8/1999 | Anderson et al. | 323/234 |
| 5,960,214 A | 9/1999 | Sharpe et al. | 710/15 |
| 5,980,078 A | 11/1999 | Krivoshein et al. | 700/1 |
| 5,994,998 A | 11/1999 | Fisher et al. | 375/258 |
| 6,014,612 A | 1/2000 | Larson et al. | 702/183 |
| 6,016,523 A | 1/2000 | Zimmerman et al. | 710/63 |
| 6,035,240 A | 3/2000 | Moorehead et al. | 700/2 |
| 6,047,222 A | 4/2000 | Burns et al. | 700/79 |
| 6,076,171 A | 6/2000 | Kawata | 713/501 |
| 6,094,600 A | 7/2000 | Sharpe et al. | 700/19 |
| 6,140,911 A | 10/2000 | Fisher et al. | 375/258 |
| 6,192,281 B1 | 2/2001 | Brown et al. | 700/2 |
| 6,233,626 B1* | 5/2001 | Swales et al. | 710/11 |
| 6,260,004 B1* | 7/2001 | Hays et al. | 702/183 |
| 6,263,487 B1 | 7/2001 | Stripf et al. | 717/1 |
| 6,298,377 B1 | 10/2001 | Hartikainen et al. | 709/223 |
| 6,337,856 B1 | 1/2002 | Schanhals et al. | 370/352 |
| 6,360,277 B1* | 3/2002 | Ruckley et al. | 709/223 |
| 6,370,448 B1* | 4/2002 | Eryurek | 700/282 |
| 6,377,859 B1 | 4/2002 | Brown et al. | 700/79 |
| 6,535,983 B1* | 3/2003 | McCormack et al. | 713/310 |
| 6,574,515 B1 | 6/2003 | Kirkpatrick et al. | 700/19 |
| 6,640,308 B1* | 10/2003 | Keyghobad et al. | 713/300 |
| 6,711,446 B2 | 3/2004 | Kirkpatrick et al. | 700/19 |
| 6,757,725 B1 | 6/2004 | Frantz et al. | 709/223 |
| 6,780,047 B1 | 8/2004 | Laity et al. | 439/501 |
| 6,788,980 B1* | 9/2004 | Johnson | G05B 19/042 700/1 |
| 6,961,624 B2 | 11/2005 | Kirkpatrick et al. | 700/270 |
| 7,016,741 B2 | 3/2006 | Arntson | 700/19 |
| 7,046,983 B2 | 5/2006 | Elkayam et al. | 455/402 |
| 7,286,556 B1* | 10/2007 | Jackson | H04L 12/10 370/425 |
| 2003/0171827 A1* | 9/2003 | Keyes, IV | G05B 19/4183 700/19 |
| 2003/0236937 A1* | 12/2003 | Barros De Almeida et al. | 710/305 |
| 2004/0158334 A1 | 8/2004 | Kirkpatrick et al. | 700/27 |
| 2004/0254648 A1* | 12/2004 | Johnson et al. | 700/1 |
| 2005/0130605 A1* | 6/2005 | Karschnia et al. | 455/90.3 |
| 2005/0288799 A1 | 12/2005 | Brewer et al. | 700/1 |
| 2006/0069455 A1 | 3/2006 | Longsdorf et al. | 700/45 |
| 2007/0019560 A1* | 1/2007 | Brewer et al. | 370/252 |

FOREIGN PATENT DOCUMENTS

| | | |
|---|---|---|
| DE | 40 08 560 A1 | 3/1990 |
| DE | 43 43 747 | 6/1994 |
| DE | 296 00 609 U1 | 3/1997 |
| DE | 197 04 694 A1 | 8/1997 |
| DE | 297 20 492 U1 | 2/1998 |
| DE | 19930660 A1 | 7/1999 |
| DE | 299 17 651 U1 | 12/2000 |
| EP | 0 601 344 A1 | 6/1994 |
| EP | 0 666 631 A2 | 1/1995 |
| EP | 0 782 297 | 2/1997 |
| EP | 0 825 506 A2 | 7/1997 |
| EP | 0 838 768 A2 | 9/1997 |
| EP | 0 807 804 A2 | 11/1997 |
| EP | 1058093 A1 | 5/1999 |
| FR | 2 302 514 | 9/1976 |
| GB | 2 310 346 | 8/1997 |
| GB | 2 329 039 | 3/1999 |
| JP | 52-108194 | 9/1977 |
| JP | 3-212799 | 9/1991 |
| JP | 07162345 A | 6/1995 |
| JP | 07225530 | 8/1995 |
| JP | 08247076 | 9/1996 |
| JP | 2712625 | 10/1997 |
| JP | 2712701 | 2/1998 |
| WO | WO 96/12993 | 5/1996 |
| WO | WO 98/06024 | 2/1998 |
| WO | WO 98/13677 | 4/1998 |
| WO | WO 00/64099 | 10/2000 |
| WO | WO 00/70531 | 11/2000 |
| WO | WO 2005/052881 | 6/2005 |

OTHER PUBLICATIONS

Office Action from U.S. Appl. No. 11/184,730, dated Mar. 31, 2009.
"Fieldbus Support for Process Analysis" by, Blevins et al., Fisher-Rosemount Systems, Inc., 1995, pp. 121-128.
"Fieldbus Technical Overview Understanding Foundation™ fieldbus technology", Fisher-Rosemount, 1998, pp. 1-23.
"Hypertext Transfer Protocol—HTTP/1.0" by, Berners-Lee et al., MIT/LCS, May 1996, pp. 1-54.
"Infranets, Intranets, and the Internet" by, Pradip Madan, Echelon Corp, Sensors, Mar. 1997, pp. 46-50.
"Internet Technology Adoption into Automation" by, Fondl et al., Automation Business, pp. 1-5.
"Internet Protocol Darpa Internet Program Protocol Specification" by, Information Sciences Institute, University of Southern California, RFC 791, Sep. 1981, pp. 1-43.
"Introduction to Emit", emWare, Inc., 1997, pp. 1-22.
"Is There A Future For Ethernet in Industrial Control?", Miclot et al., Plant Engineering, Oct. 1988, pp. 44-46, 48, 50.
LFM/SIMA Internet Remote Diagnostics Research Project Summary Report, Stanford University, Jan. 23, 1997, pp. 1-6.
"Managing Devices with the Web" by, Howard et al., Byte, Sep. 1997, pp. 45-64.
"Modular Microkernel Links GUI and Browser for Embedded Web Devices" by, Tom Williams, pp. 1-2.
"PC Software Gets Its Edge From Windows, Components, and the Internet", Wayne Labs, I&CS, Mar. 1997, pp. 23-32.
Proceedings Sensor Expo, Aneheim, California, Produced by Expocon Managemnet Associates, Inc., Apr. 1996, pp. 9-21.
Proceedings Sensor Expo, Boston, Massachuttes, Produced by Expocon Management Associates, Inc., May 1997, pp. 1-416.
"Smart Sensor Network of the Future" by, Jay Warrior, Sensors, Mar. 1997, pp. 40-45.
"The Embedded Web Site" by, John R. Hines, IEEE Spectrum, Sep. 1996, p. 23.
"emWare's Releases EMIT 3.0, Allowing Manufacturers to Internet and Network Enable Devices Royalty Free," 3 pages, PR Newswire (Nov. 4, 1998).
Warrior, J., "The IEEE P1451.1 Object Model Network Independent Interfaces for Sensors and Actuators," pp. 1-14, Rosemount Inc. (1997).

(56) References Cited

OTHER PUBLICATIONS

Warrior, J., "The Collision Between the Web and Plant Floor Automation," 6$^{Th}$. WWW Conference Workshop on Embedded Web Technology, Santa Clara, CA (Apr. 7, 1997).
"Internal Statistical Quality Control for Quality Monitoring Instruments", by P. Girling et al., *ISA*, 15 pgs., 1999.
Web Pages from www.triant.com (3 pgs.).
"A Microcomputer-Based Instrument for Applications in Platinum Resistance Thermomety," by H. Rosemary Taylor and Hector A. Navarro, Journal of Physics E. Scientific Instrument, vol. 16, No. 11, pp. 1100-1104 (1983).
"Experience in Using Estelle for the Specification and Verification of a Fieldbus Protocol: FIP," by Barretto et al., Computer Networking, pp. 295-304 (1990).
"Computer Simulation of H1 Field Bus Transmission," by Utsumi et al., Advances in Instrumentation and Control, vol. 46, Part 2, pp. 1815-1827 (1991).
"Progress in Fieldbus Developments for Measuring and Control Application," by A. Schwaier, Sensor and Acuators, pp. 115-119 (1991).
"U.S. Appl. No. 11/393,005, filed Mar. 29, 2006.".
"Notification of Transmittal of the International Search Report and the Written Opinion of the International Searching Authority, or the Declaration", PCT/US2006/028065, filed Jul. 19, 2006.
"Ein Emulationssystem zur Leistungsanalyse von Feldbussystemen, Teil 1," by R. Hoyer, pp. 335-336 (1991).
"Automation On-line" by, Phillips et al., Plant Services, Jul. 1997, pp. 41-45.
"Climb to New Heights by Controlling your PLCs Over the Internet" by, Phillips et al., Intech, Aug. 1998, pp. 50-51.
"CompProcessor For Piezoresistive Sensors" MCA Technologies Inc. (MCA7707), pp. 1-8.
"Ethernet emerges and viable, inexpensive fieldbus", Paul G. Schreier, Personal Engineering, Dec. 1997, p. 23-29.
"Ethernet Rules Closed-loop System" by, Eidson et al., Intech, Jun. 1998, pp. 39-42.
"Fieldbus Standard for Use in Industrial Control Systems Part 2: Physical Layer Specification and Service Definition", ISA-S50.02-1992, pp. 1-93.
"Fieldbus Standard for Use in Industrial Control Systems Part 3: Data Link Service Definition", ISA-S50.02-1997, Part 3, Aug. 1997, pp. 1-159.
Fieldbus Standard For Use in Industrial Control Systems Part 4: Data Link Protocol Specification, ISA-S50.02-1997, Part 4, Aug. 1997, pp. 1-148.
"IEEE802.3af Power Over Ethernet: A Radical New Technology," wwww.PowerOverEthernet.com, pp. 1-10.
"Traditional Temperature Monitoring Applications," http://www.rosemount.com/products/temperature/m848arc.html#mounts.
"The Rosemount 3420 Fieldbus Interface Module allows Fieldbus Process Monitoring in Any Plant!" http://www.rosemount.com/products/accessories/m3420.html.
"A Revolution in Industrial Networking?" http://www.industrialnetworking.co.uk/mag/v9-3/f_poe.html.
Harry Forbes, ARC Insights, "Ethernet Devices Power Up," Insight #2002-46M, Oct. 9, 2002.
"Power Over Ethernet Specification Approved IEEE 802.3af Gives Hope to Device-Level Ethernet," http://www.manufacturing.net/ctl/article/CA318961?text=poe&spacedesc=news.
"Article: Powered Ethernet Spells Out Change for Field Devices," http://ethernet.industrial-networking.com/articles/i17fielddevices.asp.
"Fieldbus Interface Module," Emerson Process Management, Product Data Sheet, Jul. 2004.
"POE—Power Over Ethernet," http://www.altair.org/labnotes_POE.html.
Article: "New FieldConnex™ Fieldbus Power Hub Provides Multiple Power Supplies Fieldbus Devices via Digital Data Lines", http://www.am.pepperl-fuchs.com/news/news.asp.
Article: "ISIHART™—Distributed HART Multiplexer", http://www.fint.no/fint_products_hart_mux.html.
"Power over Ethernet", aus Wikipedia, der freien Enzyklopadie, file://C:\DOCUME~1\mm22318\LOCALS~1\Temp\Q2TZF6Z2.htm, Nov. 14, 2006, 2 pages.
Notification of Transmittal of the International Search Report and the Written Opinion o fthe International Searching Authority, or the Declaration, PCT/US2006/023942, filed Jul. 20, 2006.
"Invitation to Pay Additional Fees", PCT/US2006/028065, filed Jul. 19, 2006.
D5000 Series Users Manual, 23 pages, Revised Jan. 1, 1998.
"ACE pc," Arcom Control Systems, 1 page dated Feb. 23, 2000, downloaded from http://www.arcom.co.uk/products/iep/systems/ace/default.htm.
"Smart Transmitter (HART Protocol) Interface Products," 1770 Communication Products, 2 pages dated Apr. 26, 1999, downloaded from http://www.ab.com/catalogs/html/b112/io/smart.html.
"Smart Head and Rail Mount Temperature Transmitters," Models 644H and 644R, Fisher-Rosemount Managing the Process Better, pp. 37-52 (1998).
"Smart Temperature Transmitter," Models 3144 and 3244MV, Fisher-Rosemount Managing the Process Better, pp. 19-36 (1998).
Instruction Manual FD0-BI-Ex12.PA, German language document, and apparent English equivalent Part No. 107591, Jan. 24, 2001.
Babb, M., "Looking Around for More Work to Do," Control Engineering International, vol. 43, Nr. 14, pp. 59-60, 62 (Oct. 1996).
Universal temperature multiplexer for Foundation Fieldbus, Universal converter, analogue, F2D0-TI-Ex8.FF, 2003.
Valve Coupler for Foundation Fieldbus, Manual FD0-VC-Ex4.FF, Nov. 22, 2000.
PROFIBUS-PA Valve Coupler Filed Box, 2002 IS Catalog, 2002.
PROFIBUS-PA Sensor Interface Field Box, 2002 IS Catalog, 2002.
EC-Type Examination Certificate for FD0-VC-Ex4.Pa dated Dec. 18, 1998 (German Language document and apparent English translation).
Supplement to EC-Type Examination Certificate for FD0-VC-Ex.Pa dated Sep. 18, 2000 (German Language document and apparent English translation).
Supplement to EC-Type Examination Certificate for FD0-VC-Ex4.Pa dated Sep. 21, 2000 (German Language document and apparent English translation).
1$^{st}$ Amendment to EC-Type Examination Certificate for FD0-VC-Ex4.Pa dated Dec. 22, 1999 (German Language document and apparent English translation).
"Model 848T Eight Input Temperature Transmitter with Foundation™ Fieldbus," Product Data Sheet 00813-0100-4697, Mar. 2003.
Office Action from Chinese Patent Office in related Chinese application.
"Invitation to Pay Additional Fees," PCT/US2006/028065, filed Jul. 19, 2006.
First Communication for European Patent Application 06 788 153.2, filed Jul. 20, 2006.
The International Search Report and Written Opinion from foreign application No. PCT/US2006/028429 filed Jul. 20, 2006.
Official Action from Russian patent application No. 2008106473, dated May 26, 2009.
Wikipedia definition: (http://en/wikipedia.org/wiki/Wireless_LAN).
Wikipedia definition for multiplexer and de-multiplexer: (http://en/wikipedia.org/wiki/Multiplexer).
First examination report for Chinese patent application 200680026507.8, filed Jul. 19, 2006.
First Communication for European patent application 06 773 602.5, dated Jun. 6, 2008.
Second Communication for European patent application 06 773 602.5, dated May 26, 2009.
First Office Action for Chinese patent application No. 200680026376.3, dated Aug. 28, 2009.
Second Official Action for Russian patent application No. 2008106473, dated Oct. 6, 2009.
First Office Action for Chinese patent application No. 200680025970.0, dated Aug. 21, 2009.

(56) References Cited

OTHER PUBLICATIONS

"The Study on Power Over Ethernet (POE) Technology," Process Automation Instrumentation, vol. 26, No. 1, p. 5-8, Jan. 2005.
Summons to attend oral proceedings for European patent application No. 06788153.2, dated Dec. 8, 2009.
Third Official Action for Russian patent application No. 2008106473, dated Jan. 18, 2010.
Communication issued by European Patent Office for European application No. 06788153.2, dated Apr. 15, 2010.
Second Office Action for Chinese patent application No. 2006800263763 dated Jun. 2, 2010.
First Office Action for Japanese patent application No. 2008523001, dated May 26, 2010.
Notification of the Results of Checking the Patentability of the Invention for Russian patent application No. 2008106473 dated Jul. 30, 2010.
Decision of Rejection (final rejection) from the Japanese patent application No. 2008-523001 dated Sep. 14, 2010.
Indian Office Action dated Jul. 30, 2014 for corresponding Indian Application No. 316/DELNP/2008, filed Jan. 11, 2008.
The minutes from corresponding European patent application No. 06788153.2 dated Jan. 10, 2012.
Notification of Reasons for Rejection from corresponding Japanese application No. 2011-000835 dated Mar. 6, 2012.
Summons to attend oral proceedings from corresponding European patent application No. 06788153.2 dated Sep. 15, 2011.

* cited by examiner

FIELD DEVICE WITH POWER OVER ETHERNET

CROSS-REFERENCE TO RELATED APPLICATION

The present application is based on and claims the benefit of U.S. provisional patent application Ser. No. 60/700,785, filed Jul. 20, 2005, the content of which is hereby incorporated by reference in its entirety.

BACKGROUND OF THE INVENTION

Process monitoring and control systems, such as those used in chemical processes, petroleum, or other types of industrial processes, typically include a centralized monitoring and control system communicatively coupled to a workstation of an operator or user and to one or more field devices via analog or digital communication paths. Field devices can be sensors adapted to monitor process parameters (such as temperature, pressure, flow rate, and the like) and/or transducers adapted to perform operations on the industrial process (such as opening and closing valves, and so on).

Generally, the centralized monitoring and control system receives signals indicative of process measurements made by the field devices and/or other information pertaining to the field devices via an input/output (I/O) device or module, which may be analog or digital. Monitoring systems receive signals indicative of process measurements and monitor various aspects of a process based on the received signals. Monitoring systems can be adapted to compare measured process data against pre-determined limits and to initiate an action (such as generating an alarm signal) if the limit is exceeded.

A process controller of a monitoring and control system can use the measurements and other information to monitor a process and to implement a control routine. The process controller can generate control signals, which can be sent over buses or other communication paths or channels via an analog or digital I/O device to the field devices to control the operation of a particular process.

Conventionally, various communication protocols were developed to enable controllers and field devices from different manufacturers to exchange data. Various communication protocols include, for example, HART®, PROFIBUS®, actuator sensor interface ("AS-Interface"), WORLDFIP®, Device-Net®, CAN, and FOUNDATION™ FIELDBUS (hereinafter "fieldbus") protocols. A number of these protocols are able to provide all required operating power to attached field devices.

Recently, a new communications protocol has emerged (IEEE 802.3af) relating to power delivery to distributed systems. Specifically, the standard involves delivering power over existing Ethernet cabling utilizing unused pairs (or signaling pairs) of wires within the cabling. This delivery of electrical power over Ethernet cables is referred to as "Power over Ethernet" (PoE). The IEEE standard allows for 48-volts and 350 mA to be delivered over the same Ethernet cabling (typically CAT5E cabling) as the Ethernet communications.

Therefore, there is ongoing need for field devices that can take advantage of emerging power delivery techniques and existing cabling for coupling new field devices to process monitoring and control systems.

SUMMARY OF THE INVENTION

A field device that communicates in accordance with Ethernet signaling is provided. The field device is powered by virtue of its Ethernet connection. The field device preferably includes a feature board that includes an Ethernet network connection and a field device connection. The feature board is configured to power the field device with power received through the Ethernet network connection. The feature board interacts with the field device using a process industry standard communication protocol. A method of operating a field device is also provided.

DETAILED DESCRIPTION OF ILLUSTRATIVE EMBODIMENTS

Figure 1:
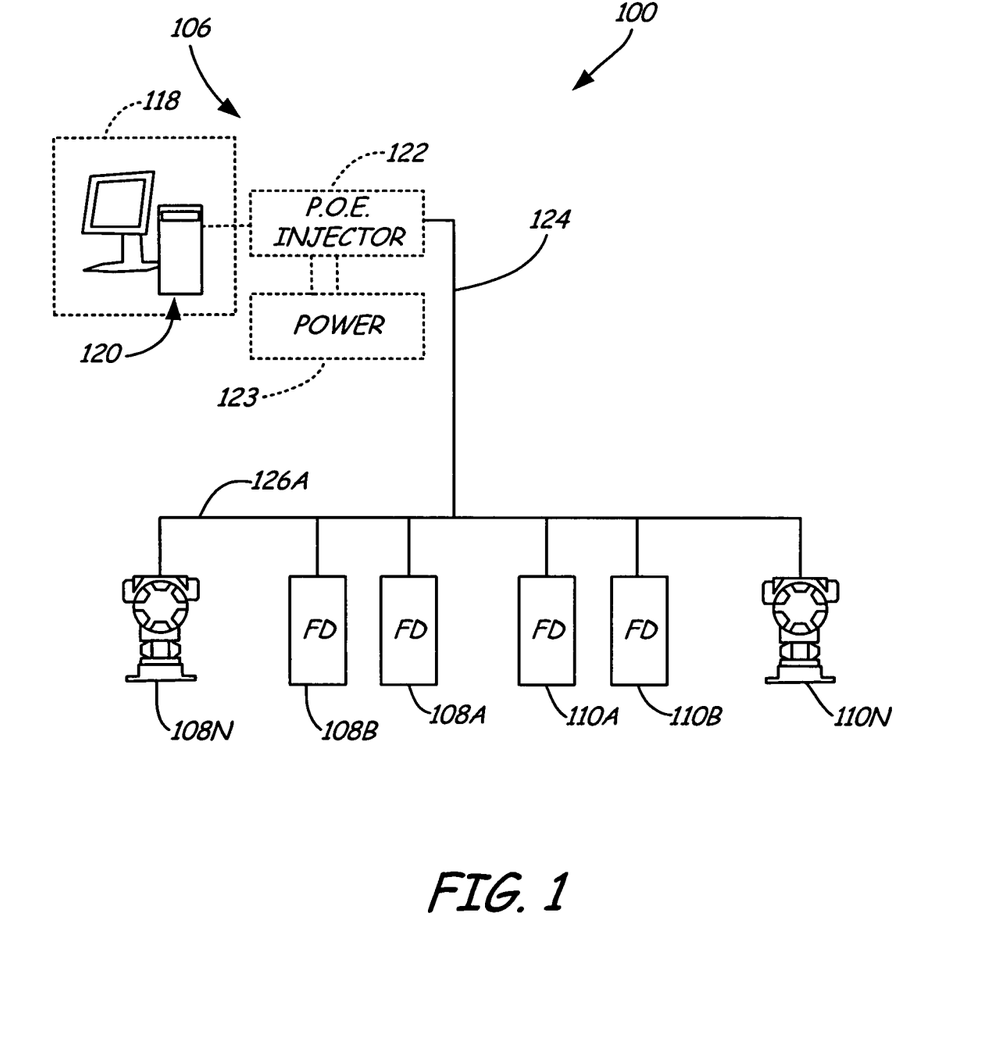
FIG. 1 is a block diagram of a process control or monitoring system with which embodiments of the present invention are particularly useful.

FIG. 1 illustrates a simplified block diagram of a process control or monitoring system 100 having a plurality of field devices 108A-110N, where any number of field devices can be used.

Process network 106 is comprised of a control or monitoring system 118 with an operator interface 120 (such as a user workstation or computer), which can be coupled through a Power over Ethernet injector (POE injector) 122 via Ethernet cabling 124 to one or more of field devices 1082A-110N. POE injector 122 receives power from power supply 123 and places a voltage potential on one or more unused pairs of wires within the Ethernet cabling 124. Alternatively, POE injector 122 can place a voltage potential on the same pairs of wires that carry the Ethernet signal. Further, injector 122 may place a voltage potential on one or more unused pairs as well as one or more data pairs.

Each field device 108A-110N is preferably adapted to derive operating power from the voltage potential on the Ethernet cabling 124. Power can be delivered on the same cable 124 as Ethernet communications. The Ethernet cabling 124 can be, for example, a CAT5E cable.

In one embodiment, a 24-volt power supply can be used to power a number of field devices. The Power over Ethernet standard (IEEE 802.3af) allows up to 48-volts and up to 350 mA to be carried by the Ethernet cabling 124. Depending on the power architecture, cable lengths, field device power requirements, intrinsic safety requirements, and the like, the PoE standard makes it possible to operate a number of field devices. Ethernet cabling 124 will generally supply 48-volts and 350 mA of current for attached field devices. With lower power field devices, the number of field devices can be increased even further. Thus, a large number of process variables can be delivered down the same cable assembly as the power supply.

By delivering power through the Ethernet cable 124, one cable pair (e.g. power cabling) can be eliminated, and installation can be made simpler. In many installations, Ethernet ports and cabling may already be in place, allowing for easy installation. Additionally, newer PoE standards, in the near future, may allow for higher voltage and/or higher current delivery, thereby allowing for power delivery to more segments or networks and more field devices.

In general, by utilizing Ethernet-type communications protocols, control and/or monitoring functions can be accessed, for example, via a hypertext markup language (web-page) interface, using a standard Internet browser. In this instance, the field devices may be accessible by any addressing means, including Transmission Control Protocol/Internet Protocol (TCP/IP) addressing, Medium Access Control (MAC) addressing, Network Layer addressing, or any other electronic addressing means supported by an Internet browser, for example. The field devices could be programmed with web server software, and could be provided with unique network address. Configuration of each field device can be achieved over the Ethernet cabling 124 using, for example, web browser software available in any personal computer, such as operator interface 120.

A MAC address, for example, traditionally is in the form of a 48-bit number (or 64-bit number), which is unique to each Local Area Network (LAN) Network Interface Card (NIC). The MAC address comprises two distinct identifiers (IDs). The first identifier is a unique 24-bit manufacturer ID, and the second identifier is a 24-bit (or 40-bit) extension ID (or Board ID), which is assigned by the manufacturer. The Board ID identifies the specific NIC, which is specific to the device. In a LAN packet transmitted over the network, the destination and source MAC names are contained in the header and are used by network devices to filter and forward packets.

Ethernet packets are variable length units in which information can be transmitted over an Ethernet network. Each Ethernet packet includes a synchronization preamble, a destination address (TCP/IP, MAC, Network Layer and so on), a source address, a field containing a type-code indicator, a data field that varies from 46 to 1500 bytes, and a cyclical redundancy check that provides a value for confirming data accuracy. In one embodiment, the destination address is a device specific address corresponding to a particular device 408 (shown in FIG. 4). In an alternative embodiment, the data field contains an address specific to the particular field device.

Regardless of the addressing protocol used, the various field devices 108A-110N are adapted to transmit and receive information in packets over the same Ethernet cabling 124 from which they derive power. The control signals, measurement signals, and so on, can be packetized into the data field of an Ethernet frame, for example, for transmission over the network.

Figure 2:
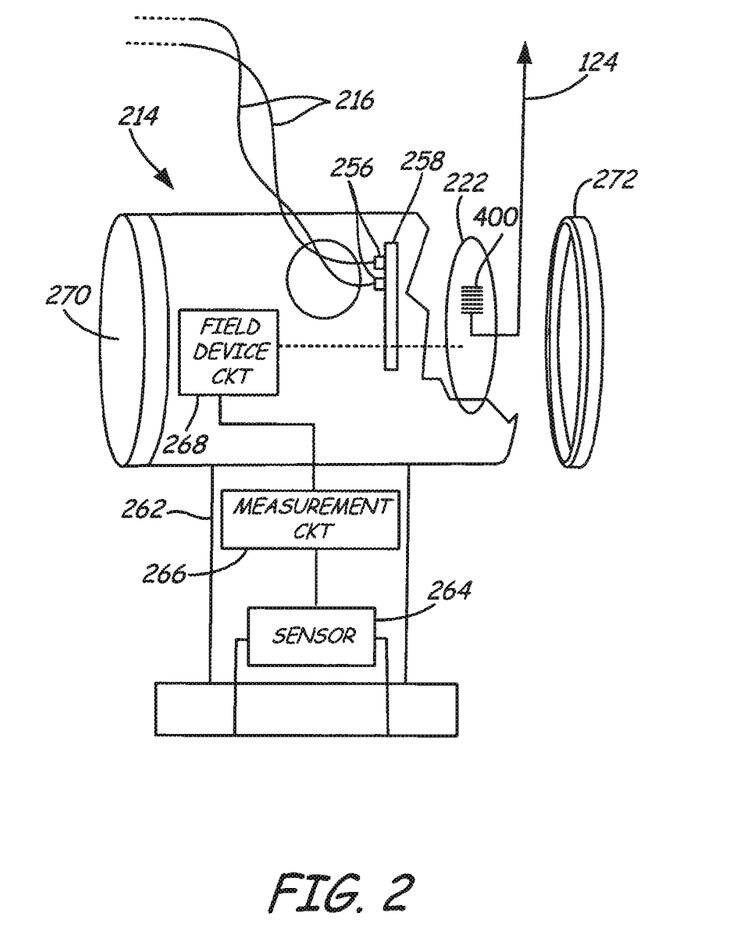
FIG. 2 is a simplified cutaway partially exploded view of pressure transmitter in accordance with an embodiment of the present invention.

FIG. 2 is a simplified cutaway partially exploded view of pressure transmitter 214, which is one example of a field device. Other examples of field devices include valves, actuators, controllers, alarm modules, diagnostic devices, et cetera. Many field devices include, or are coupled to, a transducer which interacts with the process. A transducer may be a sensor for sensing a characteristic of the process, or a valve controller or solenoid for effecting some change in the process.

Pressure transmitter 214 couples to two-wire process control loop 216 and includes transmitter housing 262. Housing 262 includes end caps 270 and 272 which can be screwed into housing 262. When attached, end caps 270 and 272 provide an intrinsically safe enclosure for circuitry within transmitter 214.

Process control loop 216 couples to terminals 256 carried on terminal board 258. A pressure sensor 264, which is one example of a transducer, is configured to couple to a process fitting to measure a differential pressure occurring in the process fluid. The output from sensor 264 is provided to measurement circuitry 266 which couples to field device circuit 268. Field device circuit 268 is configured to communicate with measurement circuit 266 to determine the process variable value sensed by sensor 264, and to communicate the value over process communication loop 216.

Feature board 222 couples to field device circuitry 268 and may, in some embodiments, couples to process control loop 216. A feature board is any circuitry, module or group of components that is configured to couple to an interface and provide a feature. Feature boards for field devices are known to provide wireless communication, as well as local operator interfaces. In accordance with an embodiment of the present invention, feature board 222 is configured to operate in accordance with the PoE protocol, and allow interaction with field device 214 over the PoE communication link. Embodiments of the present invention can also be practiced with integral PoE circuitry, but the utilization of a feature board is important in that it allows already-installed, legacy field devices, to be provided with this new communications ability.

Figure 3:
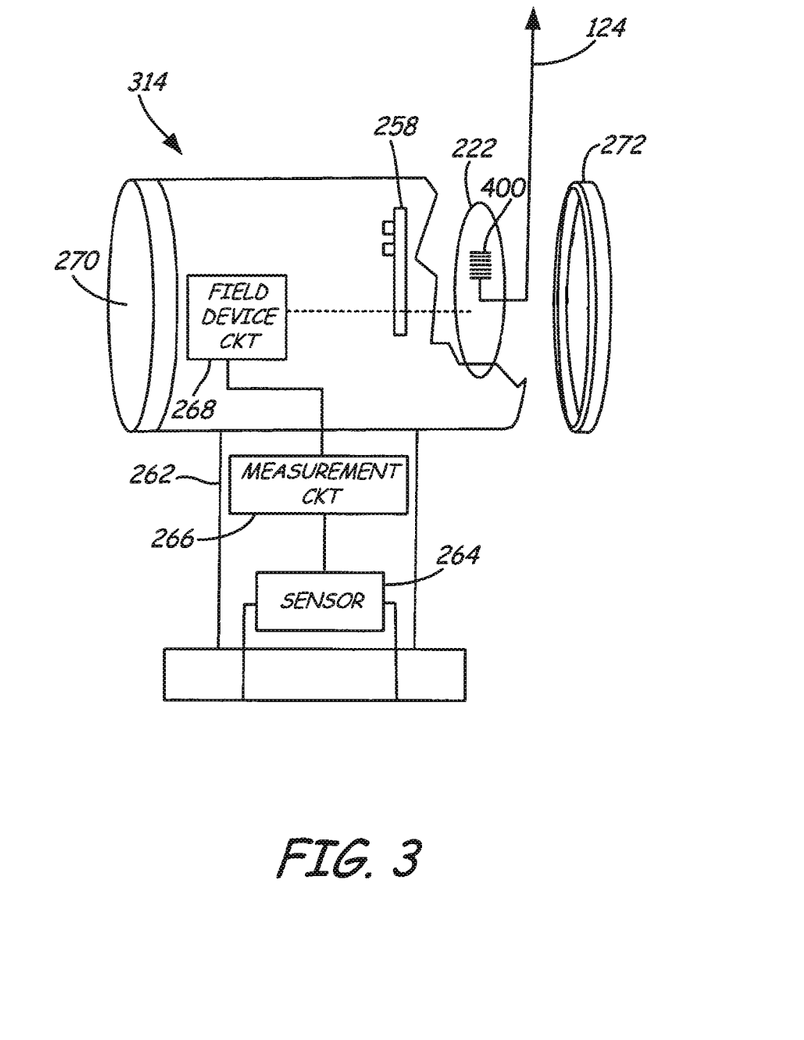
FIG. 3 is a simplified cutaway partially exploded view of pressure transmitter in accordance with another embodiment of the present invention.

FIG. 3 is a simplified cutaway partially exploded view of pressure transmitter 314, which is another example of a field device. Transmitter 314 is similar to transmitter 214, and like components are numbered similarly. Unlike transmitter 214, transmitter 314 does not couple directly to a process communication loop. Instead, feature board 222 operably couples transmitter 314 to PoE network connection 124. Depending on the configuration of feature board 222, transmitter 314 may be wholly powered by energy received from feature board 222 over PoE network connection 124. Further, the communications between feature board 222 and field device circuitry 268 can be in accordance with any suitable process communications protocol including, without limitation, HART®, PROFIBUS®, actuator sensor interface ("AS-Interface"), WORLDFIP®, Device-Net®, FOUNDATION™ FIELDBUS, and Controller Area Network (CAN). Thus, field devices that are not otherwise adapted for communication in accordance with the PoE protocol, can communicate in their native protocol with feature board 222, which can translate, or otherwise adapt, such communication for transmission over PoE network 124.

Figure 4:
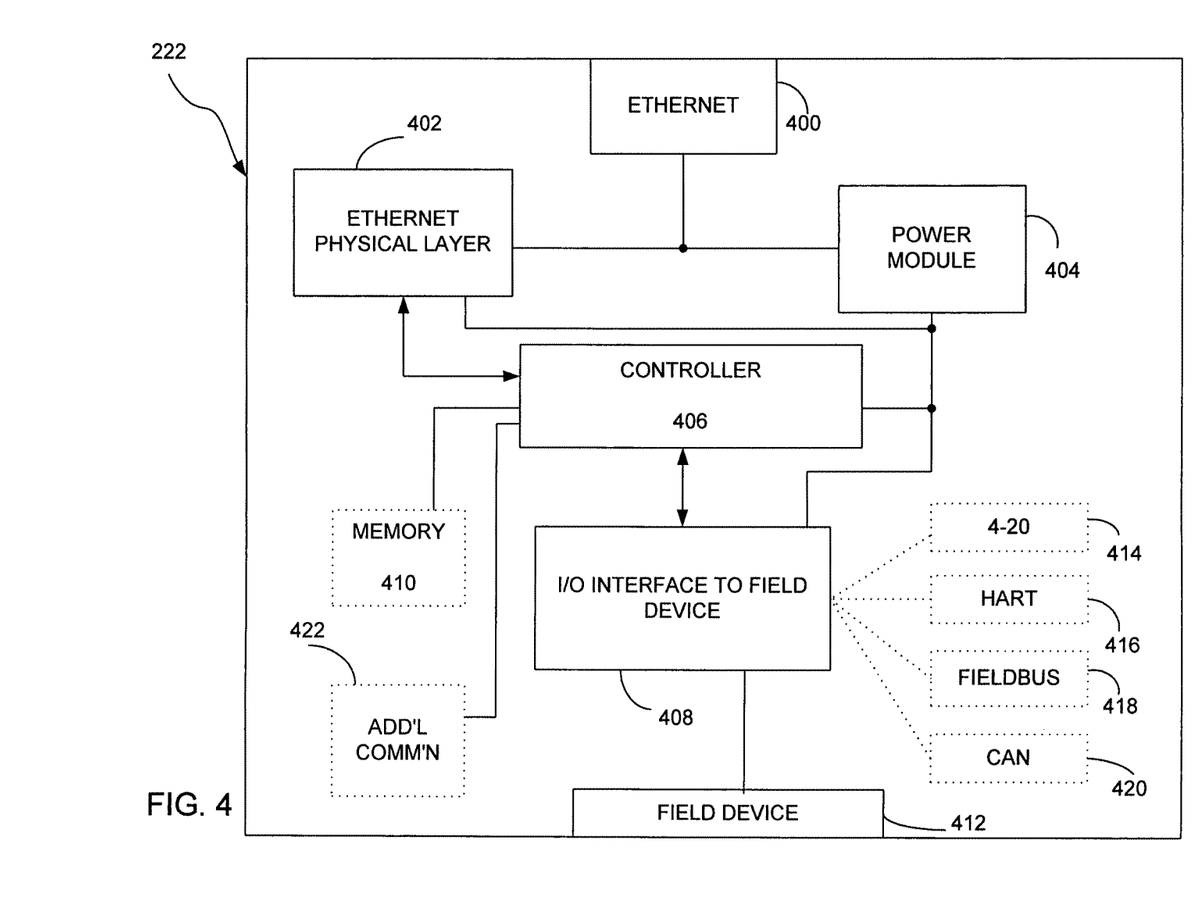
FIG. 4 is a block diagram of a feature board for use with a field device in accordance with an embodiment of the present invention.

FIG. 4 is a block diagram of a feature board for use with a field device in accordance with an embodiment of the present invention. Feature board 222 includes Ethernet connector 400 that is configured to couple to an Ethernet network in accordance with the PoE standard. Preferably connector 400 is in the form of a known RJ-45 connector, but may take other suitable forms in order to facilitate use in industrial environments. Examples of adaptations of connector 400 include material selection, connector size, retention mechanisms or latches, or other suitable criteria. Connector 400 is coupled to Ethernet physical layer module 402, and PoE power module 404. Ethernet physical layers or cores are known, and provide the low-level signal interactions on the Ethernet media. Power module 404 is coupled to connector 400 allowing feature board 222 to receive electrical power from the Ethernet connection in accordance with the PoE standard. As such, power module may draw up to 350 mA at 48 volts, if need be. Power module 404 is coupled to Ethernet physical layer module 402, controller 406, and field device I/O interface module 408 to supply all required operating energy to those components.

Controller 406 is preferably a microprocessor and may include memory such a read-only memory (ROM), random access memory (RAM). Additionally, feature board 222 may include additional memory (shown in phantom at 410) that is coupled to controller 406. The additional memory can be useful to allow controller 406 to perform more sophisticated functions. For example, controller 406 may execute instructions stored therein, or within memory 410, to perform any of the following functions: web server; ftp server; secure shell (ssh) server. Moreover, controller 406 and memory 410 may even comprise an embedded information server capable of running an operating system. An example of such a system is sold under the trade designation Etherstix, available from Gumstix Inc, of Portola Valley, Calif. More information can be found on the web at www.gumstix.com. Additionally, memory 410 can be used to store information about a number of commercially available field devices, such that when feature board 222 is ultimately coupled to a particular field device, the feature board can simply be told which particular field device it is coupled to, and then access further information regarding that particular device within memory 410 in order to determine how to interact with the field device. The manner in which feature board 222 is informed of the field device can take any suitable form including setting jumpers on feature board 222, sending commands to feature board 222 through the Ethernet network; and/or accessing a rudimentary operator interface (not shown) on feature board 222.

Controller 406 is coupled to field device I/O interface module 408, which is coupled to field device connector 412. Connector 412 is preferably configured to physically couple to a field device in a manner that known feature boards currently coupled to field devices. However, embodiments of the present invention can also be practice where connector 412 is any suitable connection including simply coupling feature board 222 to the process communication loop terminals of a field device using wires or the like.

Field device I/O interface module 408 is configured to interact with the field device, attached to feature board 222 through connector 412, using any suitable process communication protocol. Thus, if the field device is only able to provide a process variable value indication by setting a current between 4 and 20 mA, module 408 may generate a suitable current for the field device. Preferably, module 408 provides energization current to the attached field device through connector 412. For example, a 4-20 mA pressure transmitter may receive its operating current from feature board 222 through connector 412. Any suitable process communications protocol can be used for module 408 including 4-20 mA as indicated in phantom at 414, Highway Addressable Remote Transducer (HART®) as indicated in phantom at block 416, Fieldbus as indicated in phantom at block 418, Controller Area Network as indicated in phantom at block 420, or any other suitable protocol. Moreover, a plurality of protocol-specific modules 414, 416, 418, and 420 can be used to provide feature board 222 with compatibility for a number of various process industry communication protocols. Thus, a single type of feature board can be mass produced for use with an expansive array of field devices. Moreover, feature board 222 can be instructed by a technician to engage a particular protocol-specific module.

Feature board 222 may include additional communications modules, such as module 422 illustrated in phantom. Module 422 may allow additional communication methods, such as wireless communication with feature board 222, and thus field device 412. Communication module 422 also derives all of its operating power through PoE power module 404, and allows or facilitates communication in accordance with a different communication protocol, such as the known Bluetooth communication protocol, IEEE 802.11b wireless access points and wireless networking devices built by Linksys of Irvine, Calif.), cellular or digital networking technologies (such as Microburst® by Aeris Communications Inc. of San Jose, Calif.), ultra wide band, free space optics, Global System for Mobile Communications (GSM), General Packet Radio Services (GPRS), Code Division Multiple Access (CDMA), spread spectrum technology, infrared communications techniques, SMS (Short Messaging Service/text messaging), or any other suitable wireless technology. This additional communication may facilitate local interaction between the feature board-enhanced field device and a maintenance technician near the device who is able to interact with the field device using the wireless protocol.

Although the present invention has been described with reference to preferred embodiments, workers skilled in the art will recognize that changes may be made in form and detail without departing from the spirit and scope of the invention.

What is claimed is:
1. A field device assembly comprising:
a field device including:
a transducer configured to couple to a process;
a housing;
field device circuitry operably coupled to the transducer and disposed within the housing; and
a terminal board including a field device connector configured to couple to a process communication loop to communicate information over and receive power from the process communication loop in accordance with a process industry standard protocol, wherein the information communicated over the process communication loop is information used to control a process variable using the transducer or information sent by the field device related to a process variable sensed by the transducer wherein the field device circuitry is powered with power received from the process communication loop;
a feature board coupled to the field device and disposed within the housing, the feature board including:
an Ethernet physical layer module coupled to an Ethernet connector;
an Ethernet power module coupled to the Ethernet connector and configured to power the field device with energy received through the Ethernet connector;
wherein the Ethernet physical layer module and the Ethernet power module are embodied upon the feature board;
a field device input/output (I/O) interface module configured to couple to the field device circuitry through the field device connector of the terminal board, communicate with the field device circuitry through the process communication loop, and provide power to the field device circuitry through the process communication loop using power provided from the Ethernet power module; and
a controller operably coupled to the field device input/output (I/O) interface module and to the Ethernet connector.
2. The field device assembly of claim 1, wherein the transducer is a sensor configured to sense the process variable.
3. The field device assembly of claim 1, wherein the transducer is an actuator.

4. The field device assembly of claim 1, wherein the field device circuitry is wholly powered by energy received from the feature board.

5. The field device assembly of claim 1, wherein the feature board includes a wireless communication module.

6. The field device assembly of claim 1 wherein the feature board is configured to receive configuration information which identifies a particular field device to which it is coupled from a plurality of different field devices.

7. The field device assembly of claim 6 wherein the configuration information is received through jumpers sets on the feature board.

8. The field device assembly of claim 6 wherein the configuration information is received through commands received by the feature board through an Ethernet network.

9. The field device assembly of claim 6 wherein the configuration information is received through an operator interface on the feature board.

10. The field device assembly of claim 1 wherein the feature board includes a memory which stores information about a plurality of field devices to which the feature board may be coupled.

11. The field device assembly of claim 10 wherein the controller determines how to interact with the field device based upon the information stored in the memory.

12. The field device assembly of claim 11, wherein the field device input/output (I/O) interface module includes a plurality of process industry communication protocol-specific modules.

13. The field device assembly of claim 1, wherein the field device input/output (I/O) module includes at least one process industry communication protocol-specific module.

14. The field device assembly of claim 13, wherein the process industry communication protocol module includes a 4-20 mA module.

15. The field device assembly of claim 13, wherein the process industry communication protocol-specific module communicates with the field device circuitry using a native protocol of the field device.

16. The field device assembly of claim 13, wherein the process industry communication protocol-specific module includes a Highway Addressable Remote Transducer HART® module.

17. The field device assembly of claim 13, wherein the process industry communication protocol-specific module includes a FOUNDATION™ FIELDBUS module.

18. The field device assembly of claim 13, wherein the process industry communication protocol-specific module includes a Controller Area Network (CAN).

19. The field device assembly of claim 1 wherein the controller is configured to translate communications received from the field device for transmission by the Ethernet physical layer module.

* * * * *